(12) United States Patent
Reilly

(10) Patent No.: US 6,776,392 B1
(45) Date of Patent: Aug. 17, 2004

(54) RETRACTABLE PLUG ASSEMBLY

(75) Inventor: Michael N. Reilly, Glendora, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 0 days.

(21) Appl. No.: 10/422,298

(22) Filed: Apr. 24, 2003

(51) Int. Cl.[7] .............................................. F16K 25/00
(52) U.S. Cl. ........................ 251/186; 251/190; 251/357
(58) Field of Search ................................ 251/186, 190, 251/357, 77

(56) References Cited

U.S. PATENT DOCUMENTS

| | | | | |
|---|---|---|---|---|
| 3,211,419 A | * | 10/1965 | Hubert | 251/186 |
| 5,242,148 A | * | 9/1993 | Lange et al. | 251/357 |
| 5,318,272 A | * | 6/1994 | Smith | 251/186 |
| 6,565,065 B1 | * | 5/2003 | Palmer | 251/186 |

* cited by examiner

Primary Examiner—John Bastianelli
(74) Attorney, Agent, or Firm—Stetina Grunda Garred & Brucker

(57) ABSTRACT

A retractable plug assembly for engaging a seat ring seating surface comprises a plug housing, a plug body, a retainer ring, a wear ring, a spring retainer and a valve spring. The plug housing has the plug body slidably disposed therewithin and defines a plug body seating surface. The wear ring is mounted to the retainer ring and extends downwardly therefrom to define a wear ring bottom face positioned downwardly relative to the plug body seating surface. The valve spring, captured between the spring retainer and the plug housing, biases the plug body away from the seat ring during engagement of the wear ring to the seat ring such that inwardly flowing fluid is prevented from directly impinging the plug body seating surface. The valve spring deforms during downward movement of the plug body such that the plug body seating surface engages the seat ring seating creating a fluid-tight seal.

21 Claims, 2 Drawing Sheets

RETRACTABLE PLUG ASSEMBLY

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to valves and, more particularly, to a uniquely configured retractable plug assembly which is specifically configured to mitigate the erosive effects of abrasive fluids flowing within a valve employing linear motion valve trim.

There is currently known in the prior art, valves which include shafts and plugs that are linearly displaced during normal operation of the valve. Within these valves, which are often referred to as linear displacement valves, the plug body is disposed and movable within a disk stack or valve cage which defines a multiplicity of tortuous or non-tortuous fluid passageways. Certain linear displacement valves are configured for "over plug flow" wherein fluid flows radially inward into the interior of the valve cage from the exterior thereof, with the fluid undergoing a pressure drop as a result of the flow through the valve cage. In this arrangement, the valve is opened by lifting the plug body off a seat ring which thus allows the fluid to flow from the interior of the valve cage and out of the valve via the unblocked seat ring. Conversely, the movement of the seating surface of the plug body into sealed engagement with the complementary seating surface of the seat ring facilitates a closed or shut-off condition for the valve.

Over plug flow linear displacement valves are sometimes employed in applications wherein an erosive fluid (e.g., water with abrasive sand) is channeled therethrough. In these particular applications, when the erosive fluid flows from the outside of the valve cage to the inside thereof and exits the fluid passageways defined by the valve cage, the resultant jets erode the seating surface on the plug body. When the eroded plug body's seating angle (defined by its seating surface) makes contact with the seating angle on the seat ring (also defined by its seating surface), valve shut-off is compromised and leakage occurs. The constant leakage of the erosive or abrasive fluid further accelerates the erosion damage to the seating surface of the plug body.

The present invention specifically addresses the above-described erosion damage problem by providing a retractable plug assembly with a unique configuration specifically adapted to prevent the fluid jets exiting the valve cage from directly impinging the seating surface of the plug body and to slow the erosive fluid as it passes over the seat ring. These, and other features of the present invention, will be described below.

BRIEF SUMMARY OF THE INVENTION

The retractable plug assembly of the present invention is adapted for use in a valve arrangement comprising a valve housing having an upper section and a lower section. The lower section defines an interior chamber and a flow opening. The valve housing further includes a seat ring which is engaged to the lower section and at least partially disposed within the flow opening. Also included in the valve housing is an annular valve cage which is affixed to the lower section. The seat ring defines a seat ring seating surface.

The retractable plug assembly of the present invention includes a plug body, a plug housing, a retainer ring, a sacrificial wear ring, a spring retainer, and a valve spring. The plug body defines a plug body seating surface which is configured to be complementary to the seat ring seating surface. The plug body slides axially within the plug housing. The wear ring is affixed to a lower end of the plug housing by the retainer ring. The valve spring is disposed adjacent an upper portion of the plug body and is captured between the spring retainer and the plug housing.

The retractable plug assembly may be moved between a closed position and an open position in order to regulate the flow of fluid. In the closed position, the plug body seating surface is directly engaged with the seat ring seating surface which effectively blocks the radially inwardly flow of fluid through the valve cage and out of the flow opening. As indicated above, in the over plug flow arrangement, fluid flows into the interior chamber and thereafter radially through the valve cage from the exterior to the interior thereof. The flow of an abrasive or erosive fluid through the valve cage into the interior thereof occurs when the plug body is moved to its open position. Such a flow of abrasive fluid would normally result in the erosion of the plug body seating surface due to the impingement of the jets which exit the valve cage thereagainst.

Advantageously, in the present invention, the retractable plug assembly includes the wear ring extending downwardly from the plug housing. The wear ring defines a wear ring bottom face that is positioned downwardly relative to the plug body seating surface such that the wear ring bottom face is at a lower level than the plug body seating surface when the retractable plug assembly is in the open position. The seat ring defines a seat ring top face with the wear ring bottom face being configured to be complementary to the seat ring top face.

The valve spring of the retractable plug assembly is configured to bias the plug body away from the seat ring during initial engagement of the wear ring bottom face to the seat ring top face such that the radially inwardly flowing fluid exiting the valve cage is prevented from directly impinging the plug body seating surface. The valve spring is further configured to resiliently deform during downward movement of the plug body such that the plug body seating surface may thereafter directly engage the seat ring seating surface to create a fluid-tight seal therebetween in the closed position. The fluid-tight seal between the plug body seating surface and the seat ring seating surface facilitates a complete shut-off for the valve arrangement.

In this manner, the radially inwardly flowing abrasive fluid exiting the valve cage is blocked by the engagement of the sacrificial wear ring with the seat ring such that the jets may not directly impinge and erode the plug body seating surface while the plug body moves from the open to the closed position, and vice versa.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
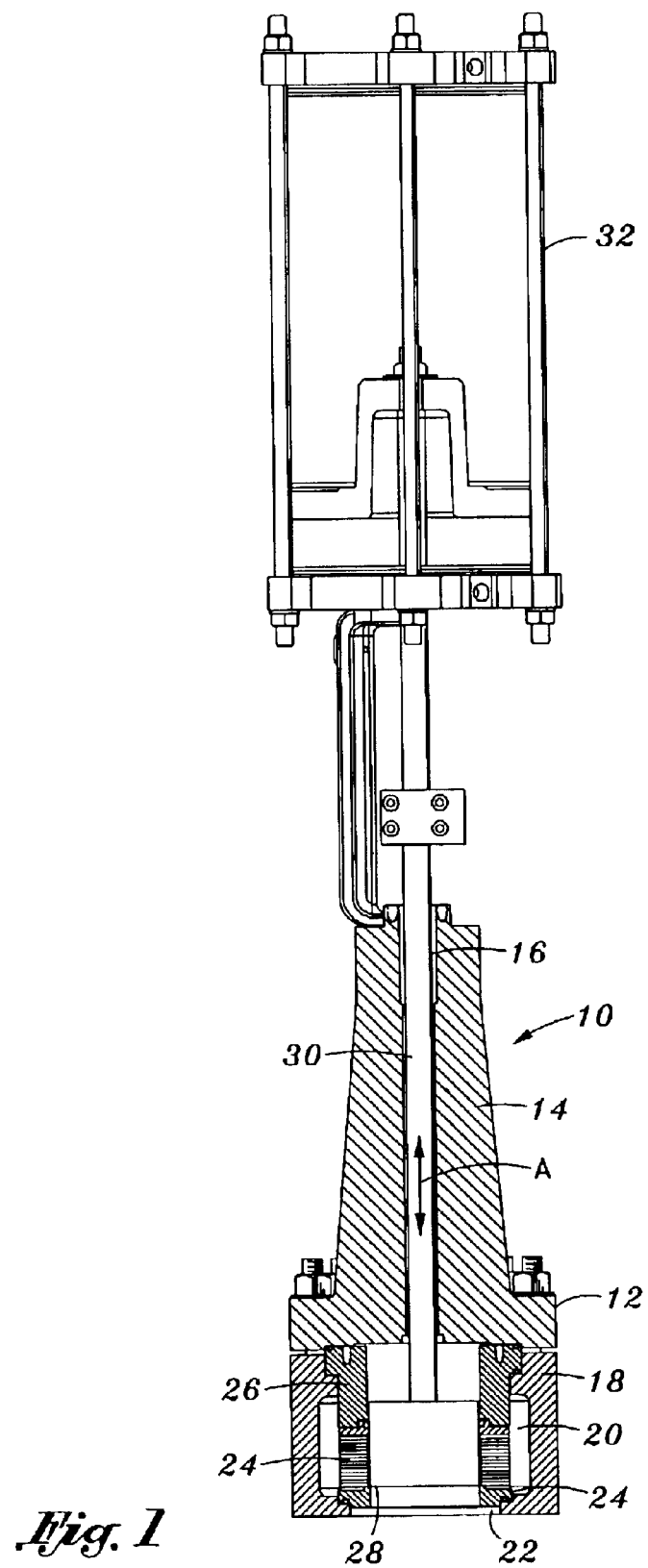
FIG. 1 is a cross-sectional view of a valve arrangement in which the retractable plug assembly of the present invention may be employed.

Referring now to the drawings wherein the showings are for purposes of illustrating preferred embodiments of the present invention only, and not for purposes of limiting the same, FIG. 1 illustrates a valve arrangement 10 in which a retractable plug assembly of the present invention may be employed. The valve arrangement 10 comprises a valve housing 12 which includes an upper section 14 having an elongate bore 16 extending axially therethrough. Bolted to the upper section 14 is a lower section 18 which defines an interior chamber 20 and a flow opening 22 which fluidly communicates with the interior chamber 20. The valve housing 12 further includes a seat ring 48 which is cooperatively engaged to the lower section 18 and at least partially disposed within the flow opening 22. Also included in the valve housing 12 is an annular sleeve 26 which is disposed within the interior chamber 20, as can be seen in FIG. 1. Also disposed within the interior chamber 20 is an annular valve cage 24 which is captured between the sleeve 26 and the lower section 18.

Figure 2:
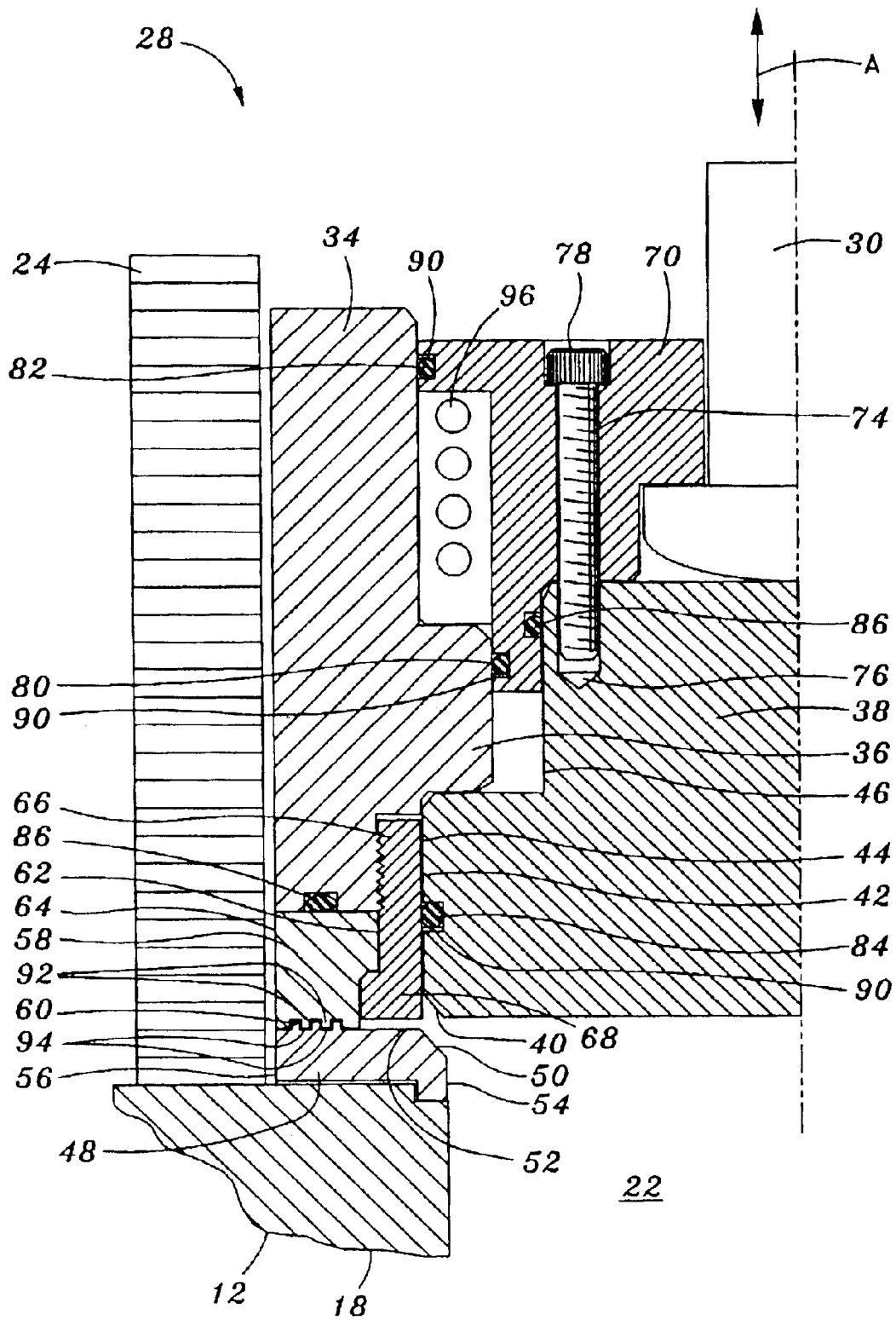
FIG. 2 is a partial cross-sectional view of the retractable plug assembly illustrating a wear ring thereof in engagement with a seat ring such that radially inwardly flowing fluid is prevented from directly impinging a plug body seating surface of the retractable plug assembly.

In addition to the valve housing 12, the valve arrangement 10 includes the retractable plug assembly 28 of the present invention which can be seen in greater detail in FIG. 2. The retractable plug assembly 28 includes the plug body 38, a plug housing 34, a retainer ring 66, a sacrificial wear ring 58, a spring retainer 70, and a valve spring 96. Attached to and extending axially from one end of the plug body 38 is an elongate shaft or rod 30 which is advanced through the bore 16 within the upper section 14 of the valve housing 12. As will be described in more detail below, an end of the plug body 38 opposite that including the rod 30 extending therefrom defines a plug body seating angle or plug body seating surface 40. The seat ring 48 itself defines a seat ring seating angle or a seat ring seating surface 50. The plug body seating surface 40 is sized and configured to be complementary to the seat ring seating surface 50.

Turning briefly back to FIG. 1, in the valve arrangement 10, the rod 30 is coupled to an actuator 32 which is operative to reciprocally move the retractable plug assembly 28 between a closed position and an open position. Though the actuator 32 is shown in FIG. 1 as being a piston actuator 32, the same may comprise any type of actuator (e.g., manual handwheel, air diaphragm, electric, hydraulic). Movement of the retractable plug assembly 28 to the open or closed position occurs as a result of the movement of the rod 30 in the directions shown by the arrow A in FIG. 1. As will be recognized, upon movement of the retractable plug assembly 28 to its open position, the same may be selectively returned to its closed position by the movement of the rod 30 in an opposite direction.

When the retractable plug assembly 28 is in its closed position, the plug body 38 is seated against the seat ring 48. In this position, the plug body seating surface 40 is directly engaged with the seat ring seating surface 50 which effectively blocks the radially inwardly flow of fluid through the valve cage 24 and out of the flow opening 22. As indicated above, in the over plug flow arrangement, fluid flows into the interior chamber 20 and thereafter radially through the valve cage 24 from the exterior to the interior thereof. The fluid flowing into the interior of the valve cage 24 undergoes a pressure drop as a result of flow through tortuous or non-tortuous fluid passageways defined by the valve cage 24. When the retractable plug assembly 28 is moved from its closed position towards its open position, fluid is able to flow across the seat ring 48, and downwardly out of the flow opening 22 of the valve arrangement 10.

As was also indicated above, the flow of an abrasive or erosive fluid through the valve cage 24 into the interior thereof occurs when the plug body 38 is moved to its open position (i.e., the plug body seating surface 40 is removed from sealed engagement with the seat ring seating surface 50). Such a flow of abrasive fluid would normally result in the erosion of the plug body seating surface 40 due to the impingement of the jets which exit the valve cage 24 thereagainst.

Advantageously, in the present invention, the retractable plug assembly 28 includes the wear ring 58 extending downwardly from the plug housing 34, as can be seen in FIG. 2. The wear ring 58 defines a wear ring bottom face 60 that is positioned downwardly relative to the plug body seating surface 40 such that the wear ring bottom face 60 is at a lower level than the plug body seating surface 40 when the retractable plug assembly 28 is in the open position. The seat ring 48 defines a seat ring top face 52 with the wear ring bottom face 60 being configured to be complementary to the seat ring top face 52.

As will be explained in more detail below, the valve spring 96 of the retractable plug assembly 28 is configured to bias the plug body 38 away from the seat ring 48 during initial engagement of the wear ring bottom face 60 to the seat ring top face 52 such that the radially inwardly flowing fluid is prevented from directly impinging the plug body seating surface 40. The valve spring 96 is further configured to resiliently deform during axially downward movement of the plug body 38 such that the plug body seating surface 40 may thereafter directly engage the seat ring seating surface 50 to create a fluid-tight seal therebetween in the closed position. The fluid-tight seal between the plug body seating surface 40 and the seat ring seating surface 50 facilitates a complete shut-off for the valve arrangement 10.

The radially inwardly flowing abrasive fluid exiting the valve cage 24 is thus blocked by the engagement of the sacrificial wear ring 58 with the seat ring 48 such that the jets may not directly impinge and erode the plug body seating surface 40 while the plug body 38 moves from the open to the closed position, and vice versa. As will be described in more detail below, the replaceable wear ring 58 allows for a controlled erosion resistance against the inwardly moving flow of the abrasive fluid while simultaneously preventing erosion damage to the plug body 38 as it moves between the open and closed positions.

Referring to FIG. 2, the retractable plug assembly 28 comprises a generally hollow or tubular plug housing 34 open on an upper end thereof and engageable to the seat ring 48 on a lower end thereof. The plug housing 34 may further define an inner plug housing flange 36 formed therearound on an inner circumference of the plug housing 34. Although the plug housing 34 may be configured in a number of different shapes and configurations, the tubular configuration shown in FIG. 2 may be sized complementary to the cylindrically-shaped valve cage 24 such that the plug housing 34 may be concentrically disposed within the valve cage 24.

The plug body 38 may have a generally stepped cylindrical configuration defining a plug body first step 44 and a plug body second step 46 disposed above the plug body first step 44. As is shown in FIG. 2, the plug body second step 46 may be of smaller size than the plug body first step 44. The plug body 38 itself is concentrically and at least partially, slidably disposed within the plug housing 34. The plug body 38 defines a plug body outer surface 42 that is sized complementary to the plug housing 34. The plug housing flange 36 may rest against the plug body first step 44 as shown in FIG. 2. As was earlier mentioned, the plug body 38 defines the plug body seating surface 40 which is sized and configured to be complementary to the seat ring seating surface 50.

The retainer ring 66 is concentrically disposed about the plug body 38 and is sized and configured to provide an axially sliding fit about the plug body 38 such that the plug body 38 may freely reciprocate within the retainer ring 66. The retainer ring 66 is shown in FIG. 2 as extending axially downwardly below the plug housing 34 and having an annular configuration. A circumferential retainer ring flange 68 extending about the retainer ring 66 may be formed thereon. The retainer ring 66 may further be fixedly engaged to the plug housing 34. Optionally, as is shown in FIG. 2, the retainer ring 66 may be threadably engaged to the plug housing 34 to facilitate its removal such that the wear ring 58 may be easily replaced after sustaining a predetermined level of erosion damage due to the abrasive fluid.

Toward this end, the retainer ring 66 may include threads formed about an outer surface thereof with the plug housing 34 including threads formed about an inner surface thereof such that the retainer ring 66 may be threadably engageable to the plug housing 34. In this manner, the wear ring 58 may be removably attached to the plug housing 34. Although the configuration of the wear ring 58 and the plug housing 34 shown in FIG. 2 illustrates threaded engagement therebetween, it is contemplated that other means for attaching the wear ring 58 to the plug housing 34 may be utilized. For example, the retainer ring 66 may include circumferentially-spaced, counterbored bolt holes formed therearound with corresponding circumferentially-spaced, tapped holes formed in the plug housing 34 lower portion such that retainer ring bolts may be utilized to removably affix the retainer ring 66 to the wear ring 58.

Importantly, the retractable plug assembly 28 of the present invention includes the wear ring 58 which, as was earlier mentioned, allows for a controlled erosion resistance against the radially inwardly flowing abrasive fluid exiting the valve cage 24. The wear ring 58 acts to block direct impingement of the jets against the plug body seating surface 40 preventing erosion thereof while the plug body 38 moves from the open to the closed position, and vice versa. The wear ring 58 has an annular configuration and is disposed about the retainer ring 66 below the plug housing 34 and being removably captured between the retainer ring 66 and the plug housing 34. The wear ring 58 extends downwardly from the plug housing 34 to define a wear ring bottom face 60.

The wear ring bottom face 60 is disposed downwardly relative to the plug body seating surface 40 such that the jets exiting the valve cage 24 may not impinge the plug body seating surface 40 when the wear ring bottom face 60 is resting against the seat ring top face 52. The wear ring 58 and the seat ring 48 may preferably be formed of an erosion resistant metal such as tungsten carbide in order to increase the useful life of the wear ring 58 and the seat ring 48 and to increase maintenance intervals of the retractable plug assembly 28. Tungsten carbide is also a desirable material for use in the wear ring 58 and the retainer ring 66 due to its excellent corrosion resistance.

In order to further effectively reduce the erosion of the plug body seating surface 40 and the seat ring seating surface 50, the wear ring bottom face 60 may include a spaced pair of projections 92 extending therearound with the seat ring top face 52 including a spaced pair of channels 94 extending therearound. The wear ring 58 defines an annular wear ring inner surface 62 and an annular wear ring outer surface 64. Likewise, the seat ring 48 defines an annular seat ring inner surface 54 and an annular seat ring outer surface 56. Because the plug body 38 may have a cylindrical configuration, the projections 92 may also each be annular in shape, with the inner projection 92 of the pair being concentrically positioned within the outer projection 92 of the pair.

The seat ring 48 and the wear ring 58 are oriented relative to each other within the retractable plug assembly 28 such that when the wear ring seating surface is brought into direct engagement with the seat ring seating surface 50, the projections 92 included within the wear ring bottom face 60 are received into respective ones of the channels 94. When the wear ring seating surface is removed from its sealed engagement to the seat ring seating surface 50 (attributable to the axially upward movement of the rod 30), a tortuous fluid path is defined between the wear ring 58 and the seat ring 48. In this regard, the projections 92 are sized and configured to cooperate with respective ones of the channels 94 in a manner wherein the projections 92 and the channels 94 collectively define the tortuous fluid path.

In an arrangement of the retractable plug assembly 28 having the projections 92 and channels 94 described above, jets of fluid flowing into the interior of the valve cage 24 are forced to flow about the outer projection 92 and through the outer channel 94, and thereafter about the inner projection 92 and through the inner channel 94 prior to reaching the seat ring seating surface 50. Thus, in the arrangement described above, the wear ring 58 and the seat ring 48 collectively define the tortuous fluid path wherein the fluid flow is subjected to eight turns prior to reaching the seat ring seating surface 50. However, as is illustrated in FIG. 2, the wear ring bottom face 60 and the seat ring top face 52 may respectively include three projections 92 and three corresponding channels 94 which collectively define the tortuous fluid path wherein the fluid flow is subjected to twelve turns prior to reaching the seat ring seating surface 50.

As will be recognized, regardless of the number of projections 92 and corresponding ones of the channels 94, if any, the tortuous fluid path becomes more tortuous as the wear ring 58 moves axially closer to its engaged position with the seat ring 48. The flow of fluid through this tortuous fluid path effectively reduces the velocity of the fluid as it passes over the seat ring 48 and the wear ring 58, reducing the erosive effects of the fluid.

Referring still to FIG. 2, the retractable plug assembly 28 includes the spring retainer 70 and the valve spring 96. The spring retainer 70 is slidably disposed within the plug housing 34 while being fixedly engaged to the plug body 38 above the plug body second step 46. The spring retainer 70 may include a radial spring retainer flange 72 extending therebout. The spring retainer flange 72 may be disposed in sliding contact with the plug housing 34. If configured in an annular shape, the spring retainer 70 may be concentrically disposed within the plug housing 34. The spring retainer 70 may alternatively be removably attached to the plug body 38 above the retainer ring 66. Such a configuration may be provided by including circumferentially-spaced tapped holes 76 within the plug body 38 and corresponding circumferentially-spaced bolt bores 74 in the spring retainer 70, as can be seen in FIG. 2. The bolt bores 74 may be axially aligned with the tapped holes 76 such that the spring retainer 70 may be removably fastened to the plug body 38 with the retaining bolts 78 extending through the bolt bores 74 and engaging the tapped holes 76. It will be appreciated that many other arrangements may be utilized for removably attaching the spring retainer 70 to the plug body 38 in order to facilitate replacement of the valve spring 96.

The valve spring 96 is shown in FIG. 2 as being captured in an annular gap collectively defined by the spring retainer flange 72 and the plug housing flange 36. In this regard, the valve spring 96 may be sized and configured to be complementary to the annular gap defined by the spring retainer 70 and the plug housing 34. However, it will be appreciated that there are many alternate configurations of the spring retainer 70 and the plug housing 34 that may be utilized for affixing the valve spring 96 thereto. Regardless of its configuration, the valve spring 96 biases the plug body 38 away from the seat ring 48 during initial engagement of the wear ring bottom face 60 to the seat ring top face 52 such that radially inwardly flowing fluid is prevented from directly impinging the plug body seating surface 40 during downward axial movement of the retractable plug assembly 28.

In this regard, the combination of the valve housing 12, the spring retainer 70 and the valve spring 96 are sized and configured such that the plug body seating surface 40 is recessed upwardly relative to the wear ring bottom face 60 when the wear ring 58 initially engages the seat ring 48. As will be described in more detail below, after the wear ring 58 engages the seat ring 48, the valve spring 96 is configured to resiliently deform during further axially downward movement of the plug body 38 such that the plug body seating surface 40 may thereafter directly engage the seat ring seating surface 50 to create a fluid tight seal therebetween. The valve spring 96 may be formed of metallic or elastomeric material exhibiting appropriate elastic properties.

During upward movement of the plug body 38, the valve spring 96 is configured such that the plug body seating surface 40 disengages from the seat ring seating surface 50 prior to disengagement of the wear ring bottom face 60 from the seat ring top face 52. The resilient characteristics of the valve spring 96 material should preferably allow the valve spring 96 to return the plug body 38 upwardly prior to disengagement of the wear ring 58 from the seat ring 48. Stainless steel is a preferred material for forming the valve spring 96. More specifically, 17-7 series of stainless steel provides excellent performance as a valve spring 96 material due to its high strength and corrosion resistance at temperature up to about 600° F.

Regarding the material selection for the plug housing 34, the plug body 38 and the retainer ring 66, stainless steel is also a preferred material due to its corrosion resistance as well as its resistance to cavitation in high-pressure, high temperature environments. More specifically, the plug housing 34 may preferably be formed of 410 series stainless steel while the spring retainer 70 may be formed of 17-7 series stainless steel. The plug body 38 may be formed of more conventional 316 series stainless steel.

In order to ensure optimum performance of the retractable plug assembly 28 and to prevent undue wear on the components of the retractable plug assembly 28, static and dynamic seals may be interposed at strategic locations within the retractable plug assembly 28. For example, a first dynamic seal 80 may be circumferentially disposed between the spring retainer 70 and the plug housing 34 below the valve spring 96 with a second dynamic seal 82 being circumferentially disposed between the spring retainer 70 and the plug housing 34 above the valve spring 96, as is shown in FIG. 2. Also shown is a third dynamic seal 84 which may be circumferentially disposed between the plug body 38 and the retainer ring 66.

Because each one of the above-mentioned pairs of components are disposed in reciprocating contact in a highly pressurized fluid environment, a fluid-tight seal is difficult to obtain due to machining surface roughness normally existing between metallic interfacing components. However, the above mentioned first, second and third dynamic seals 80, 82, 84 concentrically position the interfacing components during reciprocating motion therebetween, allowing for a more precise control of fluid flow through the valve arrangement 10. It is contemplated that such first, second and third dynamic seals 80, 82, 84 may be toroidally-shaped.

As can be seen in FIG. 2, at least one of the components in each of the above-mentioned pairs may include a circumferential groove formed therearound for receiving the toroidally-shaped seal therein. To enhance the sealing characteristics, the first, second and third dynamic seals 80, 82, 84 may be formed of elastomeric material such as a nitrile-based elastomeric material. Each one of the first, second and third dynamic seals 80, 82, 84 may further include at least one annular, planar-shaped scraper ring 90 disposed adjacent at least one of an upper and a lower side thereof, depending on the predominant direction of fluid flow. The scraper ring 90 may be configured to block the passage of particles entrained in the fluid as well as prevent the fluid pressure from extruding the respective ones of the dynamic seals 80, 82, 84 into a clearance gap between the interfacing pairs of components. Preferable locations of such scraper rings 90 are illustrated in FIG. 2. However, it is recognized that there are many configurations, quantity and locations of the dynamic seals 80, 82, 84 that may be utilized in the retractable plug assembly 28 of the present invention. For example, the dynamic seals 80, 82, 84 may have a V-shaped cross-section A first static seal 86 may also be circumferentially disposed between the spring retainer 70 and the plug body 38 with a second static seal 88 being circumferentially disposed between the wear ring 58 and the plug housing 34. Similar to the arrangement for the dynamic seals 80, 82, 84, at least one of the components in each of the above-mentioned pairs having a static seal may include a circumferential groove formed therearound for receiving the toroidally-shaped static seal 86, 88. It is recognized that the first and second static seals 86, 88 may be formed of elastomeric material such as a nitrile-based elastomeric material. It is further recognized that there are many configurations, quantity and locations of the static seals 86, 88 that may be utilized in the retractable plug assembly 28 of the present invention.

In operation, the retractable plug assembly 28 essentially minimizes or prevents wear on the critical plug body sealing surface 40. Starting in an initially open position with the retractable plug assembly 28 being disposed above the seat ring 48 wherein the seat ring top face 52 is spaced apart from the wear ring 58, the retractable plug assembly 28 is caused to moved downwardly along a direction A. The wear ring 58 initially moves downwardly toward the seat ring 48. As the wear ring 58 closes in on the seat ring 48, radially inwardly flowing fluid may erode the wear ring 58 and seat ring 48 due to particles entrained in the fluid. The wear ring bottom face 60 eventually engages the seat ring top face 52 as is shown in FIG. 2. Because the plug body seating surface 40 is recessed upwardly relative to the wear ring bottom face 60, direct impingement thereagainst by the jets exiting the valve cage 24 is prevented. Thus, erosion of the plug body seating surface 40 is also prevented.

After the wear ring 58 is engaged to the seat ring 48, the plug body 38 continues moving axially downwardly, shielded from direct impingement of the fluid by the engagement of the seat ring 48 to the wear ring 58. The valve spring 96 starts to deform during this downward movement until the plug body seating surface 40 directly engages the seat ring seating surface 50 to create a fluid-tight seal facilitating a complete shut-off for the valve arrangement 10. In the shut-off condition, fluid flow through the flow opening 22 is completely blocked.

When the plug body 38 is caused to move in an opposite direction toward the open position, the plug body seating surface 40 initially disengages from the seat ring seating surface 50. The wear ring bottom face 60 then disengages from the seat ring top face 52 during upward retraction of the plug body 38. The resiliency of the valve spring 96 allows the valve spring 96 to return the plug body 38 upwardly prior to disengagement of the wear ring 58 from the seat ring 48 such that direct impingement of the jets upon the plug body seating surface 40 is prevented. In this manner, the plug body seating surface 40 is effectively shielded from direct impingement at all times. Advantageously, the retractable plug assembly 28 may be configured such that the sacrificial wear ring 58 may be easily removed and replaced by first removing the retainer ring 66 from the plug housing 34. However, by forming the wear ring 58 from tungsten carbide, the erosion of the wear ring 58 may be controlled such that the replacement intervals of the wear ring 58 may be extended.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed:

1. A retractable plug assembly for engaging a seat ring having a seat ring top face and a seat ring seating surface, the retractable plug assembly comprising:

a hollow plug housing;

a plug body slidably disposed within the plug housing and defining a plug body seating surface which is complementary to the seat ring seating surface;

a retainer ring disposed about the plug body and fixedly engaged to and extending below the plug housing;

a wear ring fixedly disposed about the retainer ring below the plug housing and extending downwardly therefrom to define a wear ring bottom face, the wear ring bottom face being positioned at a level below that of the plug body seating surface;

a spring retainer slidably disposed within the plug housing and fixedly engaged to the plug body; and a valve spring captured between the spring retainer and the plug housing, the valve spring being configured to bias the plug body away from the seat ring during initial engagement of the wear ring bottom face to the seat ring top face such that radially inwardly flowing fluid is prevented from directly impinging the plug body seating surface, the valve spring being further configured to resiliently deform during axially downward movement of the plug body such that the plug body seating surface may thereafter directly engage the seat ring seating surface to create a fluid-tight seal therebetween.

2. The retractable plug assembly of claim 1 further comprising:

a first dynamic seal circumferentially disposed between the spring retainer and the plug housing below the valve spring;

a second dynamic seal circumferentially disposed between the spring retainer and the plug housing above the valve spring;

a third dynamic seal circumferentially disposed between the plug body and the retainer ring;

a first static seal circumferentially disposed between the spring retainer and the plug body; and a second static seal circumferentially disposed between the wear ring and the plug housing.

3. The retractable plug assembly of claim 2 wherein the first, second and third dynamic seals and the first and second static seals are each toroidally-shaped.

4. The retractable plug assembly of claim 2 wherein the first, second and third dynamic seals and the first and second static seals are each formed of an elastomeric material.

5. The retractable plug assembly of claim 2 wherein:

each one of the first, second and third dynamic seals include at least one annular scraper ring disposed adjacent at least one of an upper and lower side;

the scraper rings being configured to block the passage of particles entrained in the fluid.

6. The retractable plug assembly of claim 5 wherein each of the scraper rings has an annular, planar-shape and is formed of an elastomeric material.

7. The retractable plug assembly of claim 1 wherein:

the wear ring bottom face includes a spaced pair of projections extending therearound;

the seat ring top face includes a spaced pair of channels extending therearound;

the projections are sized and configured to cooperate with respective ones of the channels in a manner wherein the projections and the channels collectively define a tortuous fluid path configured for reducing the velocity of the fluid flowing radially inwardly toward the plug body.

8. The retractable plug assembly of claim 7 wherein:

the wear ring has an annular configuration and defines wear ring inner and outer surfaces;

the seat ring has an annular configuration and defines seat ring inner and outer surfaces;

each of the projections of the pair has an annular configuration and is concentrically positioned between the wear ring inner and outer surfaces; and each of the channels has an annular configuration and is concentrically positioned between the seat ring inner and outer surfaces.

9. The retractable plug assembly of claim 1 wherein the wear ring is formed of tungsten carbide.

10. The retractable plug assembly of claim 1 wherein the plug housing, the plug body, the retainer ring and the valve spring are formed of stainless steel.

11. The retractable plug assembly of claim 1 wherein:

the plug body includes circumferentially spaced tapped holes;

the spring retainer includes circumferentially spaced bolt bores;

the bolt bores being axially aligned with the tapped holes such that the spring retainer may be removably fastened to the plug body with retaining bolts extending through the bolt bores and threadably engaging the tapped holes.

12. The retractable plug assembly of claim 1 wherein:

the retainer ring includes threads formed about an outer surface thereof;

the plug housing includes threads formed about an inner surface thereof;

the retainer ring is threadably engageable to the plug housing and configured such that the wear ring may be removably attached to the plug housing.

13. A retractable plug assembly for engaging a seat ring having a seat ring top face and a seat ring seating surface, the retractable plug assembly comprising:

a tubular plug housing;

a cylindrical plug body concentrically and slidably disposed within the plug housing and defining a plug body seating surface being sized and configured to be complementary to the seat ring seating surface;

an annular retainer ring concentrically slidably disposed about the plug body and threadably engaged to and extending below the plug housing;

an annular wear ring disposed about the retainer ring below the plug housing and removably captured between the retainer ring and the plug housing bottom face, the wear ring extending downwardly from the plug housing to define a wear ring bottom face, the wear ring bottom face being positioned at a level below that of the plug body seating surface;

an annular spring retainer concentrically slidably disposed within the plug housing and removably attached to the plug body above the retainer ring; and an annular valve spring captured between the spring retainer and the plug housing, the valve spring being configured to bias the plug body away from the seat ring during initial engagement of the wear ring bottom face to the seat ring top face such that radially inwardly flowing fluid is prevented from directly impinging the plug body seating surface during downward movement of the retractable plug assembly, the valve spring being further configured to resiliently deform during axial downward movement of the plug body such that the plug body seating surface may thereafter directly engage the seat ring seating surface to create a fluid-tight seal therebetween, the valve spring being configured such that the plug body seating surface disengages from the seat ring seating surface prior to disengagement of the wear ring bottom face from the seat ring top face such that radially inwardly flowing fluid is prevented from directly impinging the plug body seating surface during upward retraction of the plug body.

14. The retractable plug assembly of claim 13 further comprising:

a first dynamic seal circumferentially disposed between the spring retainer and the plug housing below the valve spring;

a second dynamic seal circumferentially disposed between the spring retainer and the plug housing above the valve spring;

a third dynamic seal circumferentially disposed between the plug body and the retainer ring;

a first static seal circumferentially disposed between the spring retainer and the plug body; and a second static seal circumferentially disposed between the wear ring and the plug housing.

15. The retractable plug assembly of claim 14 wherein the first, second and third dynamic seals and the first and second static seals are each toroidally-shaped and formed of an elastomeric material.

16. The retractable plug assembly of claim 14 wherein:

each one of the first, second and third dynamic seals include at least one annular, planar-shaped scraper ring disposed adjacent at least one of an upper and lower side;

the scraper rings being configured to block the passage of particles entrained in the fluid.

17. The retractable plug assembly of claim 13 wherein:

the wear ring bottom face includes a spaced pair of projections extending therearound;

the seat ring top face includes a spaced pair of channels extending therearound;

the projections are sized and configured to cooperate with respective ones of the channels in a manner wherein the projections and the channels collectively define a tortuous fluid path configured for reducing the velocity of the fluid flowing radially inwardly toward the plug body.

18. The retractable plug assembly of claim 17 wherein:

the wear ring defines wear ring inner and outer surfaces;

the seat ring defines seat ring inner and outer surfaces;

each of the projections of the pair has an annular configuration and is concentrically positioned between the wear ring inner and outer surfaces; and each of the channels has an annular configuration and is concentrically positioned between the seat ring inner and outer surfaces.

19. The retractable plug assembly of claim 17 wherein the channels and the projections are each configured such that the tortuous fluid path defines at least twelve substantially right-angled turns.

20. The retractable plug assembly of claim 13 wherein the wear ring is formed of tungsten carbide.

21. The retractable plug assembly of claim 13 wherein the plug housing, the plug body, the retainer ring and the valve spring are each formed of stainless steel.

* * * * *